United States Patent
Hanawa

(10) Patent No.: US 7,591,352 B2
(45) Date of Patent: Sep. 22, 2009

(54) DAMPING VALVE AND SHOCK ABSORBER USING SAME

(75) Inventor: Nobumichi Hanawa, Tokyo (JP)

(73) Assignee: Kayaba Industry Co., Ltd., Tokyo (JP)

( * ) Notice: Subject to any disclaimer, the term of this patent is extended or adjusted under 35 U.S.C. 154(b) by 206 days.

(21) Appl. No.: 11/288,231

(22) Filed: Nov. 29, 2005

(65) Prior Publication Data

US 2006/0113834 A1 Jun. 1, 2006

(30) Foreign Application Priority Data

Nov. 30, 2004 (JP) ............................. 2004-345571
Aug. 23, 2005 (JP) ............................. 2005-240931

(51) Int. Cl.
*F16F 9/34* (2006.01)

(52) U.S. Cl. .............................. 188/266.6; 188/322.13; 188/322.2

(58) Field of Classification Search .............. 188/266.2, 188/266.5, 266.6, 322.13, 322.14, 322.21, 188/322.19, 312, 322.2; 91/440, 459, 437; 137/625.65, 625.27; 303/119.2
See application file for complete search history.

(56) References Cited

U.S. PATENT DOCUMENTS

| | | | | |
|---|---|---|---|---|
| 4,880,086 A | * | 11/1989 | Knecht et al. | 188/266.6 |
| 5,078,240 A | * | 1/1992 | Ackermann et al. | 188/285 |
| 5,251,730 A | * | 10/1993 | Ackermann et al. | 188/315 |
| 5,303,804 A | * | 4/1994 | Spiess | 188/266.5 |
| 5,558,189 A | * | 9/1996 | Beck | 188/266.6 |
| 6,224,170 B1 | * | 5/2001 | Hosoya | 303/119.2 |
| 6,745,665 B2 | * | 6/2004 | Anderson | 91/459 |
| 2003/0234508 A1 | | 12/2003 | Hanawa et al. | |
| 2004/0211632 A1 | | 10/2004 | Yamada | |

FOREIGN PATENT DOCUMENTS

| | | |
|---|---|---|
| DE | 41 37 821 A1 | 5/1993 |
| EP | 1 318 069 A2 | 6/2003 |
| JP | 2004-26092 | 1/2004 |
| JP | 2004-231036 | 8/2004 |

* cited by examiner

*Primary Examiner*—Robert A Siconolfi
*Assistant Examiner*—Vu Q Nguyen
(74) *Attorney, Agent, or Firm*—Rabin & Berdo, P.C.

(57) ABSTRACT

A damping valve (102) comprises: a first valve element (16); a first valve seat (15) in which the first valve element (16) is seated; a second valve element (26) placed in series with the first valve element (16); a second valve seat (25), placed between the first and second valve elements (16) and (26), in which the second valve element (26) is seated; an biasing mechanism (30) for biasing the second valve element (26) toward the second valve seat (25) and biasing the first valve element (16) toward the first valve seat (15) via the second valve element (26); a first liquid chamber (106); a second liquid chamber (104); and a third liquid chamber (107).

3 Claims, 5 Drawing Sheets

DAMPING VALVE AND SHOCK ABSORBER USING SAME

FIELD OF THE INVENTION

This invention relates to a damping valve and a shock absorber.

BACKGROUND OF THE INVENTION

A shock absorber is mounted on a vehicle or the like for the purpose of damping vibrations generated in a vehicle body or a vehicle steering, for example.

In particular, when shock absorbers are used for the purpose of damping vibrations generated in a steering of a two-wheel vehicle, the shock absorbers desirably generate an equal damping force at each of the right and left sides against the swing of the steering in the lateral direction with respect to the neutral position of the shock absorbers.

JP2004-231036A published by Japanese Patent Office in 2004 discloses a shock absorber which has a circuit designed to use a single damping valve and allow hydraulic fluid filling the shock absorber to always pass through the damping valve in a one-way direction when flowing in and out of two pressure chambers in the shock absorbers.

More specifically, the circuit includes two flow paths providing fluid communication between one pressure chamber and the other pressure chamber, a passage providing fluid communication between the flow paths, and the damping valve provided at the midpoint in the passage. Further, in order for the hydraulic fluid to flow through the damping valve in a one-way direction, two check valves are provided in each flow path, that is, four check valves are provided in the entire circuit.

SUMMARY OF THE INVENTION

However, because of the use of a damping valve through which hydraulic fluid flows in a one-way direction, the shock absorber needs to have four check valves provided in the entire shock absorber including the circuit, leading to high costs and complicated structure.

In this connection, a possible idea for making the structure of a shock absorber simple is of providing two damping valves through which hydraulic fluid passes in a one-way direction.

However, when control on the damping force of the shock absorber is required, the flow rate of the hydraulic fluid passing through the damping valve is adjusted. For this reason, each of the damping valves needs to be equipped with a solenoid, resulting in high costs.

Accordingly, the present invention has been made to improve the above problems. An object of the present invention is to provide a damping valve capable of reducing the manufacturing cost for a shock absorber. Another object of the present invention is to provide a shock absorber capable of being manufactured at low costs.

In order to achieve the above object, this invention provides a damping valve, the damping valve comprises a first valve element, a first valve seat in which the first valve element is seated, a second valve element placed in line and in contact with the first valve element, a second valve seat that is placed between the first valve element and the second valve element, and in which the second valve element is seated, an biasing mechanism for biasing the second valve element toward the second valve seat and biasing the first valve element toward the first valve seat via the second valve element, a first liquid chamber provided on the opposite side of the first valve seat from the first valve element and receiving hydraulic fluid introduced therein, and a second liquid chamber provided between the first valve seat and the second valve seat and receiving hydraulic fluid introduced therein.

This invention also provides a shock absorber, the shock absorber includes a cylinder, a piston dividing the inside of the cylinder into a first pressure chamber and a second pressure chamber, and the aforesaid damping valve, wherein the damping valve further comprises a third liquid chamber that is provided closer to the second valve element with reference to the second valve seat, the shock absorber comprises a first flow path establishing communication between the first pressure chamber and the second liquid chamber, a second flow path establishing communication between the second pressure chamber and the first liquid chamber, a third flow path establishing communication between the second pressure chamber and the third liquid chamber, and a check valve provided at the midpoint of the third flow path for blocking only a flow in a direction flowing out from the second pressure chamber.

The details as well as other features and advantages of this invention are set forth in the remainder of the specification and are shown in the accompanying drawings.

DETAILED DESCRIPTION OF THE PREFERRED EMBODIMENTS

Figure 1:
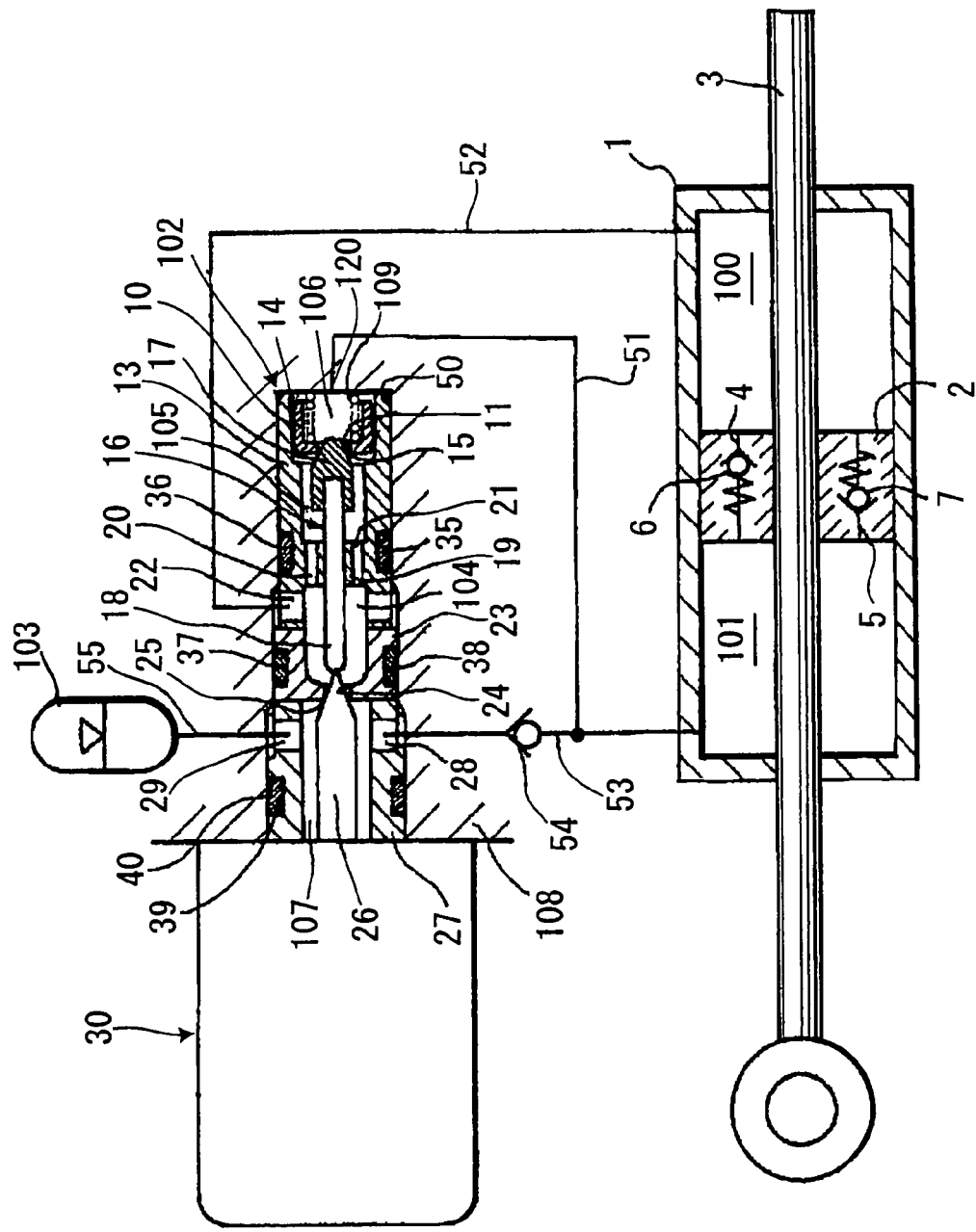
FIG. 1 is a circuit diagram and a vertically sectional view showing a shock absorber in an embodiment.

The present invention will be described below with reference to the accompanying drawings. FIG. 1 is a circuit diagram with a vertically sectional view illustrating a shock absorber in an embodiment.

As illustrated in FIG. 1, the shock absorber in the embodiment of the present invention includes a cylinder 1, a piston 2 serving as a defining member for dividing the inside of the cylinder 1 into two pressure chambers 100 and 101, a valve 102, and an accumulator 103 serving as a reservoir.

The piston 2 is slidably inserted in the cylinder 1 and the piston 2 defines the pressure chambers 100 and 101 therein. The pressure chambers 100 and 101 are filled with liquid such as hydraulic oil.

The piston 2 is connected to a piston rod 3. The shock absorber is structured as a so-called double rod type and has the piston rod 3, extending through shaft central portions of two ends of the cylinder 1.

Passages 4 and 5 are provided in the piston 2, so that the two pressure chambers 100 and 101 communicate with each other. A damping valve 6 is provided at the midpoint of the passage 4 and permits only liquid flow flowing from the one pressure chamber 100 to the other pressure chamber 101. A damping valve 7 is provided at the midpoint of the passage 5 and permits only liquid flow flowing from the other pressure chamber 101 to the one pressure chamber 100.

The valve 102 includes valve seat members 10 and 23 located in series, a pair of valve seats 15 and 25 formed in the respective valve seat members 10 and 23, a valve element 16 provided between the valve seats 15 and 25 and removably mounted in the valve seat 15, a valve element 26 removably mounted in the valve seat 25, and a solenoid 30 serving as an biasing mechanism for biasing the valve element 26 toward the valve seat 25 and biasing, via the valve element 26, the valve element 16 toward the valve seat 15.

The valve seat member 10 is formed in a closed-end tubular shape and includes a through hole 11 drilled in an axial core portion of a bottom portion and the ring-shaped valve seat 15 continuing into an end (the left end in FIG. 1) of the through hole 11.

The valve seat member 10 is slidably inserted in an enlarged diameter portion 14 which is formed on an inner periphery of an end (the right end in FIG. 1) of a first valve case 13 formed in a tubular shape, with the valve seat 15 facing inward the first valve case 13. The valve seat member 10 is biased inward the first valve case 13 by a spring 109 housed in the valve seat member 10.

The valve element 16 removably mounted in the valve seat 15 includes a poppet-type valve body 17 having a circular-truncated-cone-shaped valve head, and a push rod 18 connected to the end (the left end in FIG. 1) of the valve body 17. The push rod 18 is slidably fitted through the inner periphery of a shaft holder 19 structured by reducing the diameter of the inner periphery of a middle portion of the first valve case 13.

The inside of the valve case 13 is divided into left and right liquid chambers 104 and 105 by the shaft holder 19. The liquid chambers 104 and 105 communicate with each other by means of communicating paths 20 and 21 extending through the shaft holder 19.

A liquid chamber 106 is defined in the enlarged diameter portion 14 of the first valve case 13 by the valve seat member 10.

A port 22 providing for communication of the liquid chamber 104 with the exterior of the first valve case 13 is provided in the side portion of the first valve case 13.

The valve seat member 23, which is formed in a closed-end tubular shape and has the valve seat 25 formed in a closed-end tubular shape, is placed left (in FIG. 1) adjacent to the first valve case 13.

The valve seat member 23 is formed in the closed-end tubular shape as described above, and includes a through hole 24 drilled in an axial core portion of a bottom portion and the ring-shaped valve seat 25 continuing into the left end (in FIG. 1) of the through hole 24.

The right end (in FIG. 1) of the valve seat member 23 is in contact with the left end (in FIG. 1) of the first valve case 13. The liquid chamber 104 is defined by the valve seat member 23 and the first valve case 13.

A tubular-shaped second valve case 27 is placed left (in FIG. 1) adjacent to the valve seat member 23. The second valve case 27 houses a needle valve element 26 in a state of being movable therein. The valve element 26 has circular-cone-shaped valve head which is removably mounted in the valve seat 25. The valve element 26 is connected to a movable core of the solenoid 30 serving as the biasing mechanism.

As described earlier, a pair of valve seats 15 and 25 are placed in line and also the valve element 16 and the valve element 26 are placed in line.

The left end (in FIG. 1) of the push rod 18 of the valve element 16 is placed in contact with the leading end (i.e. the right end in FIG. 1) of the valve element 26, thereby allowing thrust of the solenoid 30 to act on the valve element 16 as well as the valve element 26.

The solenoid 30 may be of a push type or a pull type. In the case of the push type, the passage of electric current through the solenoid 30 produces thrust acting on the valve element 16 and the valve element 26 in the direction being seated in the valve seat 15 and the valve seat 25, respectively. Conversely, when no electric current passes, a spring force of a spring provided in the solenoid 30 produces thrust acting on the valve element 26 in the direction moving away from the valve seat 25. On the other hand, in the case of the pull type, the passage of electric current through the solenoid 30 produces thrust acting on the valve element 26 in the direction moving away from the valve seat 25. Conversely, when no electric current passes, a spring force of a spring produces thrust acting on the valve element 16 and the valve element 26 in the direction being seated in the valve seat 15 and the valve seat 25, respectively.

In short, in the use of either push type or the pull type, depending upon the magnitude of the electric current applied to the solenoid 30, it is possible to adjust thrust pressing the valve element 16 and the valve element 26 against the valve seat 15 and the valve seat 25, respectively. In the embodiment, the thrust of the solenoid 30 allows the valve element 16 and the valve element 26 to be seated in the respective valve seats 15 and 25.

Further, the second valve case 27 is in contact with the right end (in FIG. 1) of the case 13 of the solenoid 30. The liquid chamber 107 is defined in the second valve case 27. The liquid chamber 107 communicates with the exterior of the second valve case 27 via ports 28 and 29 which are provided in the side portion of the second valve case 27.

The valve 102 structured as described above is inserted in a valve hole 50 provided in a housing 108 and is fixed to the housing 108.

The assembly of the valve 102 is completed only by the steps of inserting into the valve hole 50, firstly the first valve case 13 housing the valve seat member 10, the spring 109 and the valve element 16 therein, then the valve seat member 23 and the second valve case 27, and then by fixing the solenoid 30 incorporating the valve element 26 to the housing 108. Thus, the assembly process is simple.

Note that the hole diameter of the valve hole 50 is increased gradually from a portion corresponding to the first valve case 13, to a portion corresponding to the valve seat member 23, and then to a portion corresponding to the second valve case 27, but it may be constant from the bottom of the hole to the opening.

Further, the valve seat member 10 is capable of moving in the enlarged diameter portion 14 by a predetermined length in the axis direction, while being biased by the spring 109 which is interposed between the bottom portion of the valve seat member 10 and the bottom portion of the valve hole 50.

The valve seat member 10 is biased toward the valve element 16 by the spring 109, thereby making it possible to move the valve element 16 to the valve seat 15 with reliability.

Note that, strictly speaking, the valve seat 15 may be provided in a stationary state in the first valve case 13. However, by having dimensional tolerance for the length in the axis direction of the valve element 16, the clearance between the valve element 16 and the valve seat 15 possibly occurs when the valve element 26 is biased. This clearance can be avoided by means of the movable valve seat member 10.

The housing 108 is provided with a flow path 51 for establishing fluid communication between the bottom portion of the valve hole 50 and the pressure chamber 101 in the cylinder 1, a flow path 52 for establishing fluid communication between a side portion of the valve hole 50 and the pressure chamber 100 in the cylinder 1, a flow path 53 for establishing fluid communication between a side portion close to the opening end of the valve hole 50 and the pressure chamber 101 in the cylinder 1, and a check valve 54 provided at the midpoint of the flow path 53 for blocking only a liquid flow from the pressure chamber 101 toward the valve hole 50.

The opening of the flow path 51 at the bottom portion of the valve hole 50 faces the opening of the right end (in FIG. 1) of the first valve case 13. The opening of the flow path 52 at the side portion of the valve hole 50 faces the port 22 provided in the side portion of the first valve case 13. Further, the opening of the flow path 53 at the side portion close to the opening of the valve hole 50 faces the port 28 provided in the side portion of the second valve case 27.

Further, a ring-shaped groove 35 is provided in the outside periphery of the first valve case 13 on the right-hand side of the port 22 (in FIG. 1). A sealing member 36 fitted into the ring-shaped groove 35 offers sealing between the outer periphery of the first valve case 13 and the inner periphery of the valve hole 50. A ring-shaped groove 37 is also provided in the outer periphery of the valve seat member 23. A sealing member 38 fitted into the ring-shaped groove 37 offers sealing between the outer periphery of the valve seat member 23 and the inner periphery of the valve hole 50. A ring-shaped groove 39 is provided in the outer periphery of the second valve case 27 on the left-hand side of the port 28 (in FIG. 1). A sealing member 40 fitted into the ring-shaped groove 39 offers sealing between the outer periphery of the valve seat member 27 and the inner periphery of the valve hole 50.

These sealing members 36, 38 and 40 prevent liquid leakage from a clearance between the housing 108 and the valve 102, and offer sealing between the flow paths 51, 52 and 53.

The flow path 51 communicates, via a port 120, with the liquid chamber 106 which is defined by the valve seat member 10 and located behind the valve seat 15 when viewed from between the valve seats 15 and 25. The flow path 52 communicates, via the port 22, with the liquid chambers 104 and 105 located between the valve seats 15 and 25. The flow path 53 communicates with the liquid chamber 107 which is defined by the second valve case 27 and located behind the valve seat 25 when viewed from between the valve seats 15 and 25.

The port 29 of the second valve case 27 is connected to an accumulator 103 serving as a reservoir, via the flow path 55 provided in the housing 108.

The shock absorber in the embodiment is structured as described hitherto. When the piston 2 moves in the cylinder 1 toward the left side of FIG. 1, the volume of the pressure chamber 101 is reduced and the volume of the pressure chamber 100 is increased, whereupon the liquid in the pressure chamber 101 flows through the passage 5 via the damping valve 7 into the pressure chamber 100.

Further, the liquid flows via the flow path 51 into the liquid chamber 106. Then, the valve seat 15 is pressed toward the left side of FIG. 1. The valve element 16 moves away from the valve seat 15, when the pressure in the liquid chamber 106 overcomes the thrust of the solenoid 30 acting on the valve element 16 so as to bias the valve 16 toward the valve seat 15 via the valve element 26.

The liquid then passes through between the valve seat 15 and the valve element 16, and flows into the pressure chamber 100 via the liquid chamber 105 and the liquid chamber 104.

Accordingly, with the shock absorber, when the piston 2 moves leftward, the damping valve 7 and the valve seat 15 and valve element 16 of the valve 102 produce a damping force.

When the valve element 16 is moved leftward, the push rod 18 comes into contact with the valve element 26. Hence, a cracking pressure for moving the valve element 16 away from the valve seat 15 is adjusted only by the thrust of the solenoid 30. Further, the clearance between the valve element 16 and the valve seat 15 is controlled by adjusting the thrust of the solenoid 30, thereby making it possible to adjust the damping force produced by the shock absorber.

Specifically, the valve seat member 10 having the valve seat 15 is movable in the enlarged diameter portion 14 by a predetermined length in the axis direction. For this reason, when the valve element 16 moves away from the valve seat 15, the valve seat member 10 travels leftward.

The movement of the valve seat member 10 allows the valve element 26 to move away from the valve seat 25 before the valve element 16 moves away from the valve seat 15. In other words, the valve element 26 is seated in the valve seat 25 after or at the same time as when the valve element 16 is seated in the valve seat 15.

Thereby, when the valve element 16 moves away from the valve seat 15, the valve element 26 certainly moves away from the valve seat 25. Hence, it is possible for the entire thrust of the solenoid 30 to act on the valve element 16, which in turn achieve a precise and delicate control on a damping force through the control only on the thrust of the solenoid 30 without likelihood of interference of the valve element 26.

Note that when the valve element 16 travels leftward, the valve element 26 is also traveled leftward. Accordingly, the valve element 26 moves away from the valve seat 25, whereby the liquid can flow into the liquid chamber 107. In this manner, the accumulator 103 and the pressure chambers 100 and 101 communicate with each other and the accumulator 103 compensates for a change in volume caused by a rise in liquid temperature.

On the other hand, when the piston 2 of the shock absorber moves in the cylinder 1 toward the right side of FIG. 1, the volume of the pressure chamber 100 is reduced and the volume of the pressure chamber 101 is increased, whereupon the liquid in the pressure chamber 100 flows through the passage 4 via the damping valve 6 into the pressure chamber 101.

Further, the liquid flows via the flow path 52 into the liquid chambers 104 and 105, so that the pressure in the liquid chambers 104 and 105 rises. The pressure rise in the liquid chambers 104 and 105 causes a force that presses the valve element 16 toward the right side of FIG. 1. The pressing force moves the valve element 16 together with the valve seat member 10 toward the right side of FIG. 1 against the spring force of the spring 109.

Further, by the pressure rise, a force to press the valve element 26 toward the left side of FIG. 1 occurs on the valve element 26. When the pressing force overcomes the thrust of the solenoid 30 biasing the valve element 26 toward the valve seat 25, the valve element 26 moves away from the valve seat 25.

The liquid flows through between the valve seat 25 and the valve element 26 into the liquid chamber 107, and further pushes the check valve 54 to be opened, thus moving via the flow path 53 into the pressure chamber 101.

Accordingly, in the shock absorber, when the piston 2 moves rightward, a damping force is produced by the damping valve 6 and the valve seat 25 and valve element 26 of the valve 102.

When the valve element 26 travels leftward, the valve element 16 is pressed rightward. For this reason, the valve element 26 is unaffected by any force from the valve element 16.

Therefore, a cracking pressure for moving the valve element 26 away from the valve seat 25 is adjusted only by the thrust of the solenoid 30. The clearance between the valve element 26 and the valve seat 25 is controlled by adjusting the thrust of the solenoid 30, thereby making it possible to adjust the damping force produced by the shock absorber.

Note that when the valve element 26 travels leftward, the accumulator 103 and the pressure chambers 100 and 101 communicate with each other. Therefore, in this case, the accumulator 103 also compensates for a change in volume caused by a rise in liquid temperature.

More specifically, the valve 102 and the shock absorber are capable of adjusting the damping force by the use of the single solenoid 30 even when the piston 2 of the shock absorber travels in either direction. Even if the same control is performed on the solenoid 30 in response to the travel of the piston 2 in both directions by means of the setting of the valve seats 15 and 25 and the valve elements 16 and 26, it is possible to achieve the same damping characteristics whichever direction the piston 2 travels.

Further, as described above, the same damping characteristics can be established whichever direction the piston 2 moves, but there is no need to configure a circuit to allow fluid to flow in only a one-way direction toward/from the valve as is done in the conventional shock absorbers. Further, the number of check valves required is only one.

Accordingly, as compared with the conventional shock absorbers, the valve 102 and the shock absorber described here become capable of reducing the length of a flow path in the shock absorber, and further of omitting three out of the four check valves required for the conventional shock absorbers. Thus, a reduction in the manufacturing costs for shock absorbers can be achieved to make it possible to manufacture shock absorbers at low cost.

For reference sake, the passages 4 and 5 and the damping valves 6 and 7 are provided in the piston 2 in the embodiment, but all of them may be not used. Further, the number of passages may be reduced to one and a throttle valve may be provided at the midpoint of the passage.

Further, the shock absorber is structured as a double rod type, but may be structured as a single rod type or a rotary type having a vane provided rotatably in a vessel for forming two pressure chambers, for example.

Note that when the shock absorber expands and contracts, the two pressure chambers communicate with the accumulator. Therefore, in the case of the single rod type, the accumulator makes, as well as compensation for liquid temperature, compensation for the amount of liquid corresponding to the volume of the piston rod extending and contracting, causing excess or deficiency in the cylinder.

Further, in the case of the single rod type of the shock absorber, the flow rate passing through the valve 102 differs between the low-pressure side and the high-pressure side. However, the settings of the valve seats 15 and 25 and the valve elements 16 and 26 and the appropriate control on the solenoid 30 make it possible for the shock absorber to provide the same damping characteristics between the low-pressure side and the high-pressure side.

Further, the biasing mechanism is defined as the solenoid 30 in the embodiment, but instead of the solenoid 30, a spring biasing the valve element 26 toward the valve seat 25 may be used. In the liquid chamber 107, a damping force can be made variable by variably setting an initial load of the spring.

FIG. 2 to FIG. 5 illustrate a valve and a shock absorber incorporating the valve according to another embodiment of the present invention. The basic structure, operations and advantageous effects of the shock absorber according to the embodiment are the same as those in the embodiment illustrated in FIG. 1. The embodiment intends simplification and miniaturization of the entire shock absorber by incorporating all the members and the circuit illustrated in FIG. 1 in the housing 108. Therefore, in the following description with reference to the drawings, all the same or similar members as those shown in the circuit in FIG. 1 are designated by the same reference numerals and the details are omitted.

In the shock absorber according to the embodiment, a cylinder 1, a valve 102, a solenoid 30 serving as the biasing mechanism and a check valve 54 are incorporated in the housing 108 having an attachment portion 110 provided on a barrel portion. In the housing 108, flow paths 51, 52 and 53 are formed and the shaft center of the solenoid 30 is placed at right angles or at more or less right angles to the shaft center of the cylinder 1.

The solenoid 30 is desirably provided in the vicinity of the attachment portion 110. Thereby, removal of a harness from the solenoid 30 and vehicle body design are made easy and also the solenoid 30 has an advantage in vibration strength.

The cylinder 1 is inserted in a hole 61 in the housing 108 along the axis direction of the housing 108. A ring-shaped flow path 52 and a ring-shaped flow path 51A connected to the flow path 51 are formed between the inner periphery of the hole 61 and the outer periphery of the cylinder 1 and partitioned off by a seal 62.

Oil seals 65 and 66 held by stoppers 67 and 68 are respectively placed on the outside of rod guides 63 and 64 at the two ends of the cylinder 1.

A double-rod type piston rod 3 is movably inserted in the cylinder 1 through a piston 2. The rod guides 63 and 64 and the oil seals 65 and 66 are slidably fitted on the respective ends of the piston rod 3. A bracket 111 is provided at one end of the piston rod 3.

Two pressure chambers 100 and 101 are defined by the piston 2 in the cylinder 1. The pressure chamber 100 communicates with the flow path 52 via a port 52A formed in the cylinder 1. The pressure chamber 101 communicates with the flow path 51A via a port 53A formed in the cylinder 1.

The flow path 51A communicates with a flow path 51B (see FIGS. 4 and 5) formed in the housing 108 and a liquid chamber 106 of a valve 102 (described later) via the flow path 51. The flow path 51A communicates also with an accumulator 103 via flow paths 53B and 53C formed in the housing 108.

The flow paths 53B and 53C have a check valve 54 provided at some midpoint. More specifically, the check valve 54, which is composed of a valve seat 71, a valve element 72 opening/closing a port of the valve seat 71 and a spring biasing the valve element 72 in the closing direction at all times, is provided at the midpoint of the flow paths 53B and 53C. The check valve 54 accepts a flow of fluid from the flow path 53C to the flow path 53B, and blocks a flow of fluid from the flow path 53B to the flow path 53C.

A sliding hole 55 forming part of the accumulator 103 and communicating with the flow path 53C is formed in the housing 108. A port 29 connected to the valve 102 is formed in the sliding hole 55. The ends of the flow path 53C and the sliding hole 55 are respectively sealed with tap members 69 and 70.

In the sliding hole 55 is placed the accumulator 103 which includes a slidable free piston 73, a spring 74 biasing the free piston 73 in one direction (the right direction in FIGS. 1 and 2), and a gas chamber 75 defined between the free piston 73 and the tap member 70. The accumulator 103 constantly applies pressure to the inside of the shock absorber to deal with expansion, contraction and fluid leakage which result from a change of fluid temperature as known publicly.

A small-diameter stopper 76 projects from the leading end of the free piston 73 to come into contact with the right end portion of the hole forming the sliding hole 55 when the free piston 73 reaches its maximum stroke in the right direction.

The stopper 76 is formed with a small diameter so as to have the sectional area smaller than that of the free piston 73 in order to prevent the free piston 73 from stopping up the flow path 53C and the port 29 when the stopper 76 is moved to a position facing the flow path 53C and the port 29.

Next, the solenoid 30 is placed in a position where its shaft center is at right angles or at more or less right angles to the shaft center of the cylinder 1. Likewise, the valve 102 is placed in a position where the valve 102 faces the solenoid 30 and also its shaft center is at right angles to the shaft center of the cylinder 1.

Figure 3:
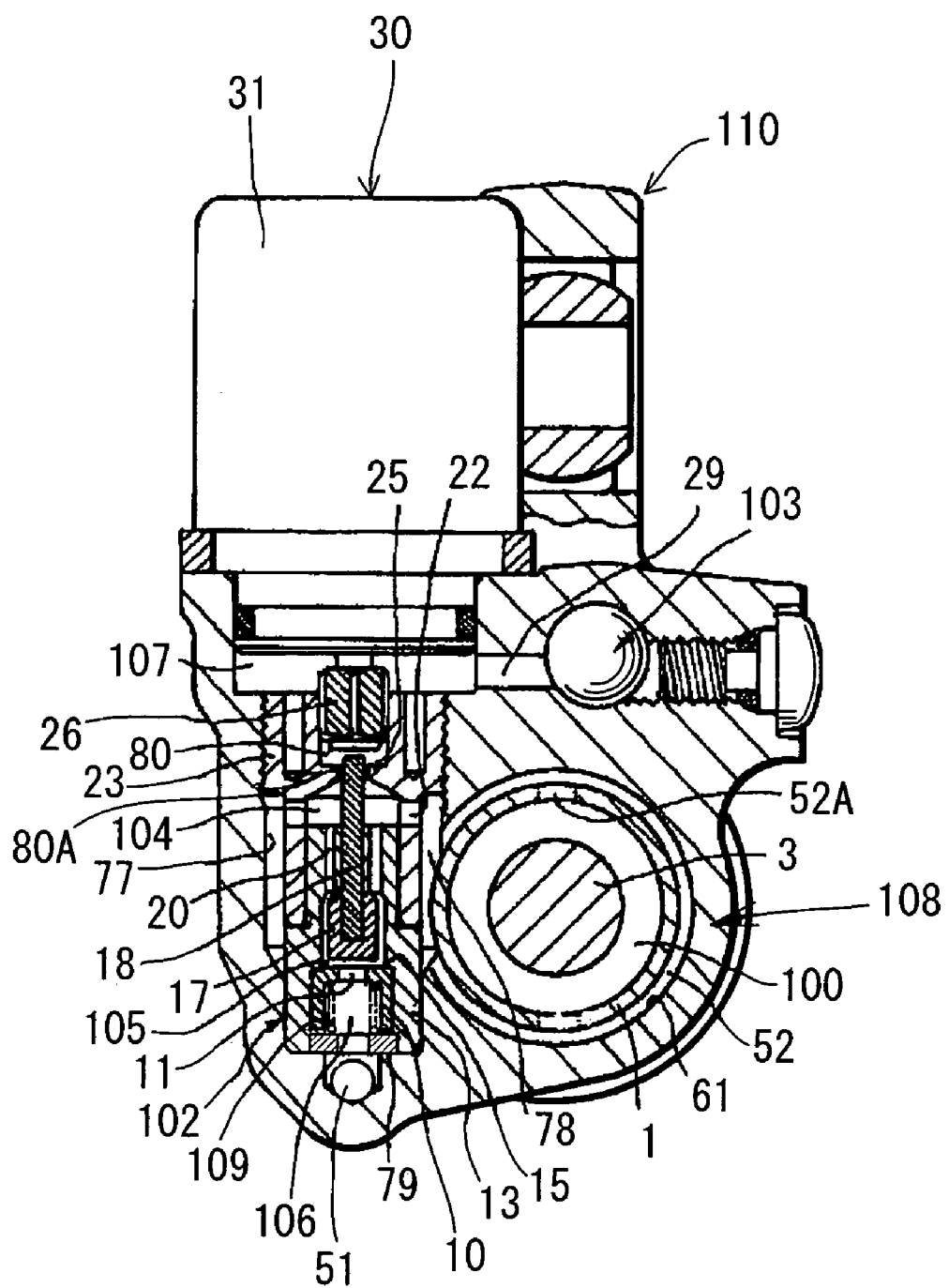
FIG. 3 is a sectional view taken along Y-Y line in FIG. 2 when viewed from the right end of the shock absorber in FIG. 2.
Figure 4:
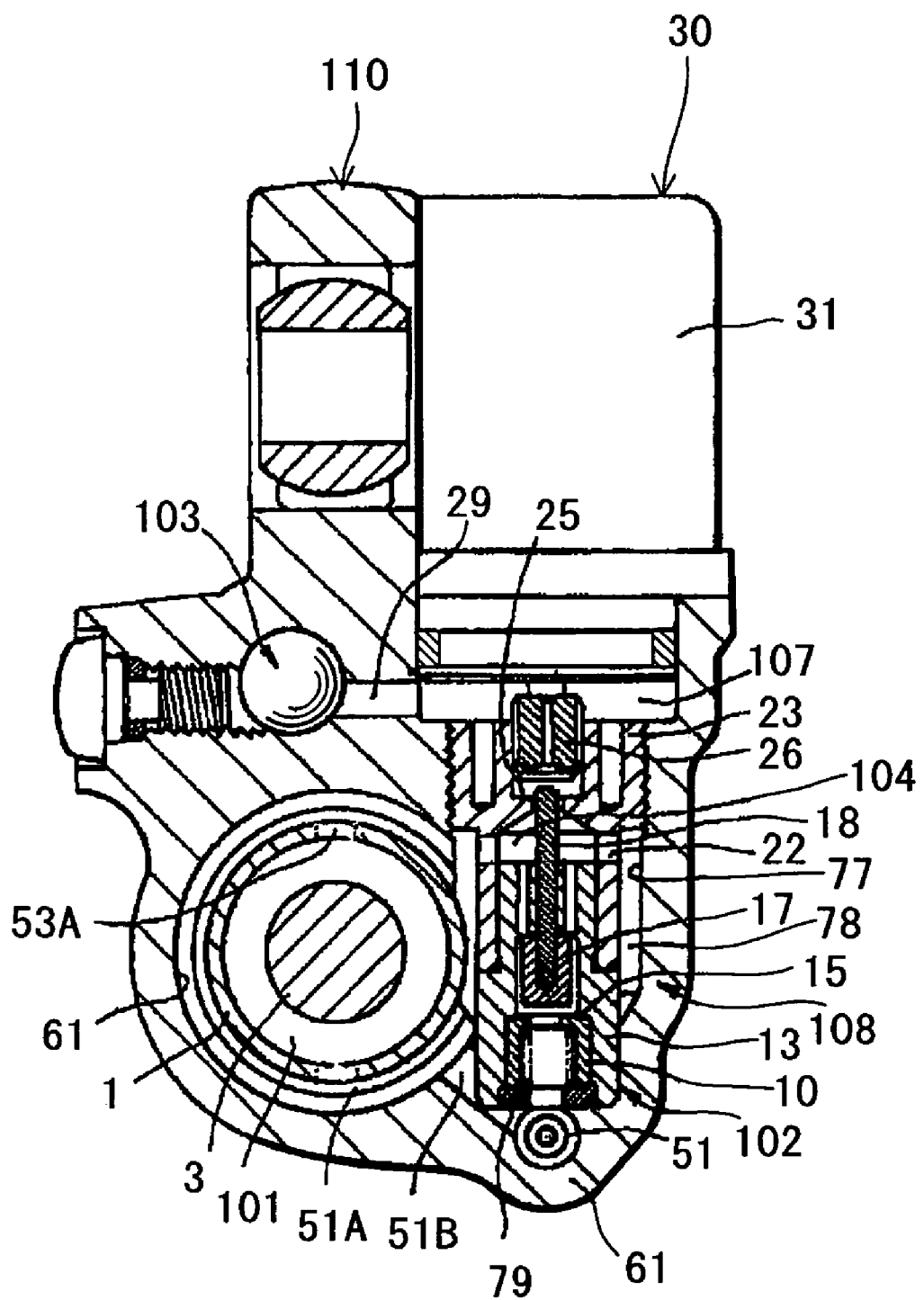
FIG. 4 is a sectional view taken along Y-Y line in FIG. 2 when viewed from the left end of the shock absorber in FIG. 2.
Figure 5:
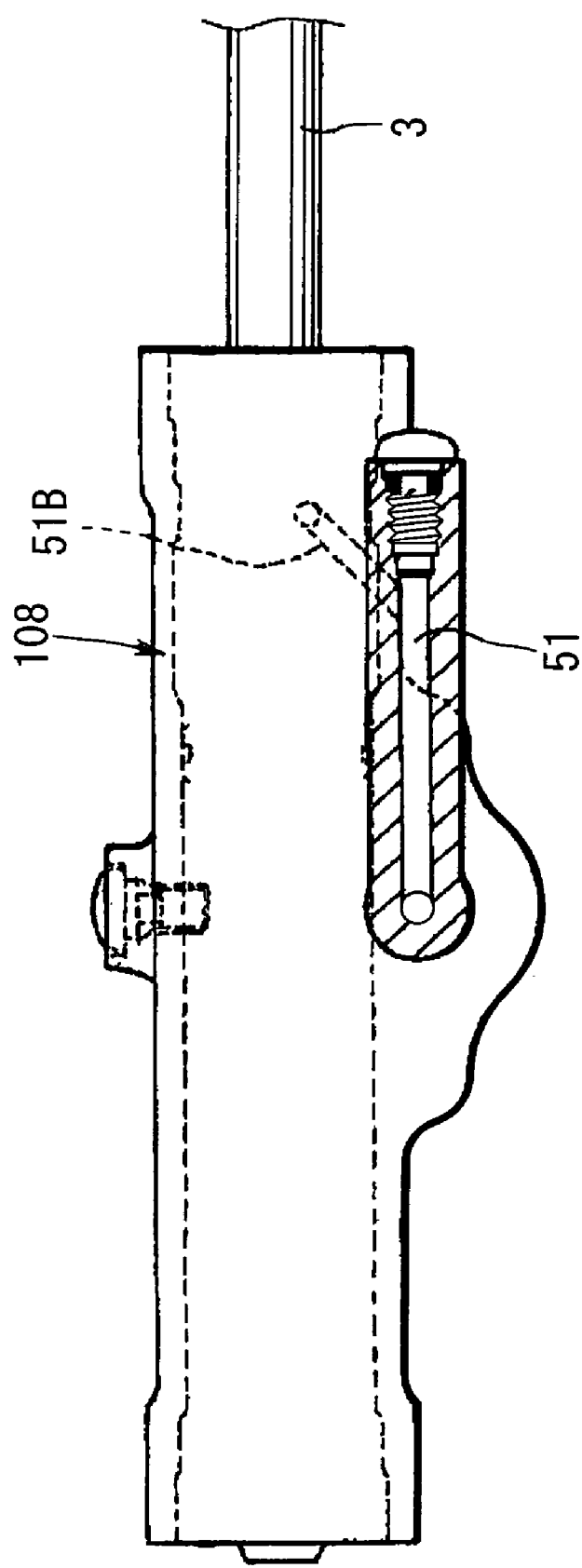
FIG. 5 is a vertically sectional view of a part of FIG. 2.

As illustrated in FIGS. 3 and 4, the valve 102 is inserted in a valve hole 77, and has a valve case 13 and a valve seat member 23 which is fitted in and in contact with the valve case 13. A flow path 78, which is formed between the valve case 13, the outer periphery of the valve seat member and the inner periphery of the valve hole 77, communicates directly with the flow path 52 on the outer periphery of the cylinder 1.

A port 22 is opened in the valve seat member 23 in the radius direction. The port 22 communicates with the central liquid chamber 104 and also with the flow path 52 via the flow path 78.

The valve case 13 receives the insertion of a C-shaped cross section valve seat member 10 having a through hole 11 formed its center, a spring 109 biasing the valve seat member 10, a spring seat 79 supporting the spring 109, a valve element 17 facing a port of the valve seat member 10 to open/close the port and having a flat face formed its lower end, and a push rod 18 communicating with the valve element 17.

The valve seat member 23 has a valve hole 80 formed therein. The push rod 18 is movably inserted in a port 80A which is formed in such a manner as to establish communication between the valve hole 80 and the liquid chamber 104.

A valve element 26 extending from the solenoid 30 is movably inserted in the valve hole 80. The valve element 26 opens/closes the port while being in contact with the leading end of the push rod 18 in its normal state.

The valve element 26 has a flat face formed at its lower end, and the outer periphery of the valve element 26 is formed in a non-circular shape to form a flow path extending in the axis direction between the valve hole 80 and the valve element 26. The flow path communicates with the liquid chamber 107 located below the solenoid 30.

Figure 2:
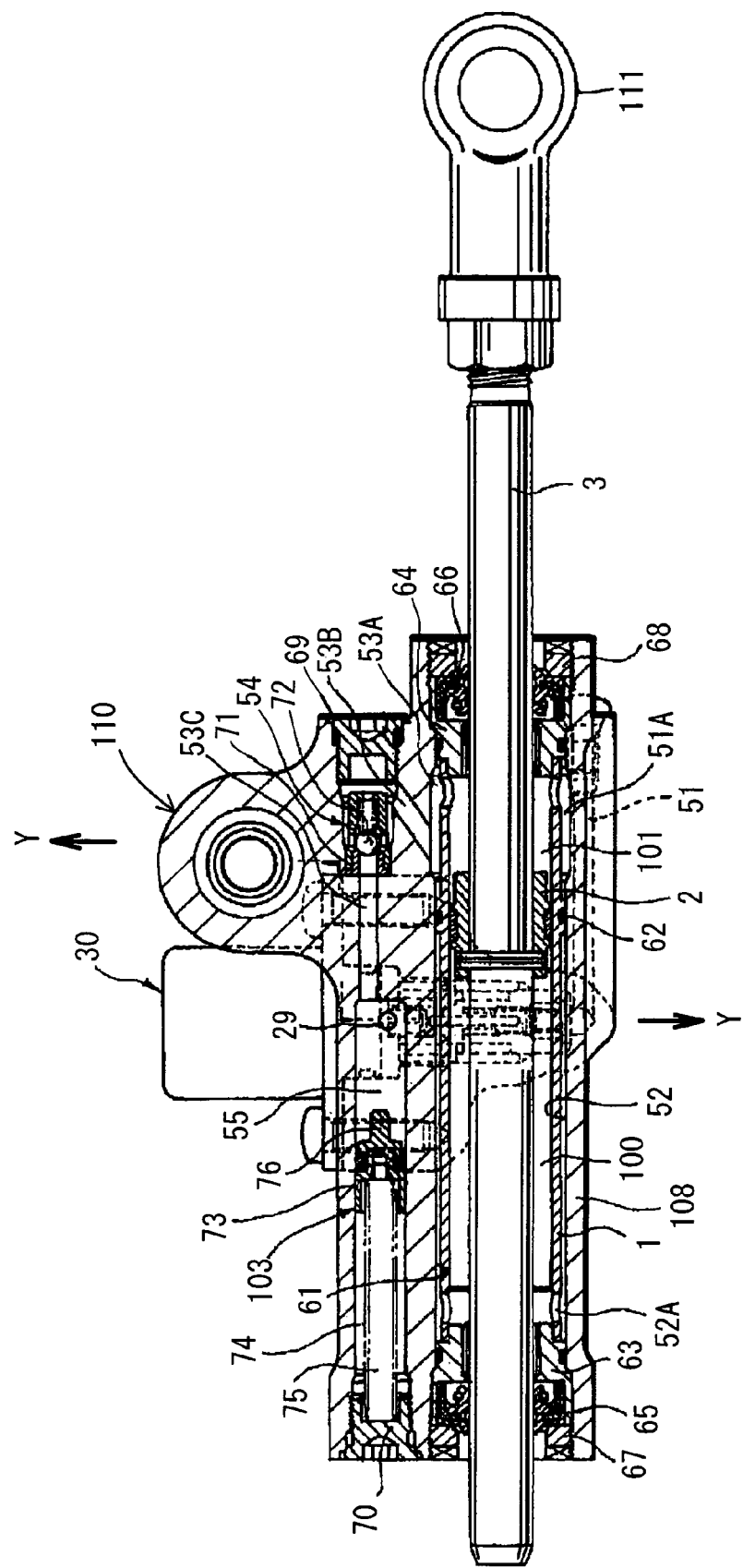
FIG. 2 is a vertically sectional view of a shock absorber in another embodiment.

The liquid chamber 107 is connected with the accumulator 103 via the sliding hole and the port 29 formed in the housing 108 (see FIGS. 3 and 4), and similarly communicates with the check valve 54 via the flow path 53C (see FIG. 2).

The shock absorber structure as described hitherto operates as in the case of the circuit described in FIG. 1. Specifically, in FIG. 2, upon the travel of the piston 2 in the left direction, the fluid in the pressure chamber 100 flows into the liquid chamber 107 via the port 52A, ring-shaped flow path 52, flow path 78, port 22, liquid chamber 104, port 80A opened by the valve element 26, and then the flow path formed on the outer periphery of the valve element 26 (see FIGS. 2 and 3). At this point, the pressure of the liquid chamber 104 closes the valve element 17, and a damping force is generated in accordance with the thrust of the solenoid 30 acting on the valve element, because of the flow from the port 80A of the valve seat 25. The fluid in the liquid chamber 107 further flows into the pressure chamber 101 via the sliding hole 55, flow path 53C, check valve 54, flow path 53C, flow path 51A and then the port 53A.

On the other hand, in FIG. 2, upon the movement of the piston 2 in the right direction, the fluid in the pressure chamber 101 flows through the port 53A into the ring-shaped flow path 51A. Further, the fluid in the flow path 51A flows into the flow path 51 via the flow path 51B formed in the housing 108 (see FIGS. 2 and 4).

Then, the fluid in the flow path 51 pushes the valve element 17 to be opened from the liquid chamber 106 to flow into the liquid chamber 104. Further, the fluid flows into the pressure chamber 100 via the port 22, flow path 78, ring-shaped flow path 52 and then the port 52A. At this point, a damping force is generated in accordance with the thrust force of the solenoid 30 acting on the valve element 17 via the valve element 26 and the push rod 18, because of the flow from the through hole 11 of the valve element 17.

Other operations and advantageous effects are the same as those in the case of the valve 102 illustrated in the circuit in FIG. 1 and the shock absorber using the valve 102.

Up to this point the embodiments of the present invention have been described. The scope of the present invention is not limited by the details themselves shown or described herein.

What is claimed is:

1. A shock absorber including a cylinder, a piston dividing the inside of the cylinder into a first pressure chamber and a second pressure chamber, and a damping valve, wherein
    the damping valve comprising:
        a first valve element;
        a first valve seat in which the first valve element is seated;
        a second valve element placed in line and in contact with the first valve element;
        a second valve seat that is placed between the first valve element and the second valve element, and in which the second valve element is seated;
        a biasing mechanism for biasing the second valve element toward the second valve seat and biasing the first valve element toward the first valve seat via the second valve element;
        a first liquid chamber provided on the opposite side of the first valve seat from the first valve element, the first liquid chamber including an inlet port, the first valve element being lifted from the first valve seat by a pressure in the first liquid chamber;
        a second liquid chamber provided between the first valve seat and the second valve seat, the second liquid chamber including an inlet/outlet port, the second valve element being lifted from the second valve seat by a pressure in the second liquid chamber; and
        a third liquid chamber provided closer to the second valve element with reference to the second valve seat, the third liquid chamber including an outlet port,
    the shock absorber comprising:
        a first flow path establishing communication between the first pressure chamber and the second liquid chamber;
        a second flow path establishing communication between the second pressure chamber and the first liquid chamber;

a third flow path establishing communication between the second pressure chamber and the third liquid chamber; and a check valve provided at the midpoint of the third flow path for blocking only a flow in a direction flowing out from the second pressure chamber.

2. The shock absorber according to claim 1, further comprising:

a reservoir establishing communication with the third liquid chamber.

3. The shock absorber according to claim 1, wherein:

the cylinder, the damping valve, the first flow path, the second flow path, the third flow path, the biasing mechanism and the check valve are incorporated in a housing provided with an attachment portion provided on a barrel portion;

the biasing mechanism is placed in the vicinity of the attachment portion; and a shaft center of the biasing mechanism is placed substantially perpendicular to a shaft center of the cylinder.

* * * * *

UNITED STATES PATENT AND TRADEMARK OFFICE
CERTIFICATE OF CORRECTION

PATENT NO.       : 7,591,352 B2                                    Page 1 of 1
APPLICATION NO. : 11/288231
DATED            : September 22, 2009
INVENTOR(S)      : Nobumichi Hanawa It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 94 days.

Signed and Sealed this

Twenty-first Day of September, 2010

David J. Kappos
*Director of the United States Patent and Trademark Office*